United States Patent Office 3,488,288
Patented Jan. 6, 1970

3,488,288
DENTURE CLEANSERS
William H. Hill, Stamford, Conn., assignor to Peter, Strong & Company, Inc., New York, N.Y.
No Drawing. Continuation-in-part of applications Ser. No. 210,584, July 17, 1962, and Ser. No. 507,705, Nov. 15, 1965. This application Mar. 4, 1968, Ser. No. 709,900
Int. Cl. C11d 7/38; A61k 7/16
U.S. Cl. 252—99        4 Claims

ABSTRACT OF THE DISCLOSURE

Improvements are provided in denture cleansers and cleansers for use in dentistry. The cleanser disclosed is a powder or particulate solid mixture dispersible in water, and contains peroxy oxygen-liberating matter for evolving gas bubbles, and an activating agent to increase or control evolution and bubbling of gas. In a previously filed disclosure, the activating agents mentioned are those having the radicle $[M(CN)_y(NO)_z]$ in which M is a metal such as iron, cobalt, nickel, manganese, copper and other metals. The present disclosure refers to such agents including also certain amino-carboxylic acids and derivatives (particularly non-cyclic), such as ethylenediamine tetraacetic acid and others, compounded with the above heavy metals, and of ion exchange resins compounded with catalytically active metals.

---

The present application is a continuation-in-part of copending applications Ser. No. 210,584 filed July 17, 1962 (now abandoned), and Ser. No. 507,705 Nov. 15, 1965, now Patent No. 3,372,125 issued Mar. 5, 1968.

The present invention relates to improvements in denture cleansers and methods of preparing the same, and more particularly to improvements in combinations of solid chemicals in mixtures that are highly useful when dispersed in liquid media for effectively and efficiently removing oral deposits including, for instance, stains from food, tobacco, or other sources; mucin; food particles; tartar and calculus.

Mixtures of solid ingredients, such as those referred to in the above applications, including one or more solid peroxidized compounds, provide means whereby bubbling is effected in a liquid medium that serves in removing oral deposits from removable dentures. It has been found that certain metal complexes may be included in cleansing mixtures containing a peroxidized compound to obtain a catalytically increased or controlled evolution of gas for more active bubbling without detracting from desirable characteristics of such mixtures as denture cleansers. In accordance with this invention, it has been found that besides inorganic, heavy metal complexes, certain organic acid materials compounded with heavy metals, and ion-exchange materials compounded with heavy metals, which materials are described hereinbelow, have desirable catalytic effects on oxygen evolution that is advantageously adaptable in cleansing operations in dentistry.

In the above application Ser. No. 210,584, stable substantially dry, odorless, free-flowing, non-lumping, non-deliquescent, non-hygroscopic, compositions are disclosed for cleansing removable dentures and for removing oral deposits therefrom. Solid ingredients are mixed together in particulate or finely divided form, preferably predominantly granular, which remain free-flowing in a container, and which, when added to water, show no tendency to form a scum, and which provide clear, non-cloudy solutions in water.

Compositions are disclosed in the above application which contain combinations consisting essentially of a mixture of dipotassium persulfate, sodium perborate, and sodium carbonate, or mixtures of sodium perborate, dipotassium persulfate, trisodium phosphate, and sodium carbonate. The following illustrate proportions in these mixtures that give good results:

(A)

|  | Parts by weight |
|---|---|
| Dipotassium persulfate | 5–25 |
| Sodium perborate | 10–50 |
| Sodium carbonate | 10–50 |

(B)

|  | Parts by weight |
|---|---|
| Sodium perborate | 10–50 |
| Dipotassium persulfate | 5–20 |
| Trisodium phosphate | 10–50 |
| Sodium carbonate | 10–50 |

The sodium perborate can be the monohydrate or the tetrahydrate. The sodium carbonate is preferably the monohydrate. The trisodium phosphate which is obtainable as fully hydrated with twelve molecules of water, should preferably be the monohydrate or the hemihydrate.

To the above may be adde other ingredients. Sodium hexametaphosphate $(NaPO_3)_6$ may be included preferably in the glassy, crushed, unadjusted form. Other sodium metaphosphates are mentioned in the form of $(HPO_3)_n$ where $n$ may be 2 or more. Other useful compounds are sodium tripolyphosphate, pyrophosphates, sodium septaphosphate, or sodium metasilicate.

Small proportions of a coloring and of a surfactant are added advantageously to a mix. Phenolphthalein provides an attractive pink coloration when in proper concentrations. A surfactant, such as "Nacconol NR," sodium dodecyl benzene sulphonate) is included in proportions below that at which a foam or scum builds up when the product is mixed with water. Other surfactants may be substituted, such as, for instance, "Duponol C" (sodium salts of sulfated fatty alcohols, such as, sodium lauryl sulphate); non-ionic surfactants, such as "Triton X–100" (water-soluble iso-octyl phenoxy polyethoxy ethanol); "Dowfax 9N9" (nonyl phenol-ethylene oxide condensate having 9–10 moles of ethylene oxide). The surfactant should preferably be one of a reasonable stability in alkaline solutions, and one that is in a solid state is desirable for ease of incorporation, though this is not essential.

A colloidal silica, also in small proportions, may be included to maintain a mix in free-flowing state and to prevent lumping when subjected to certain conditions. "Cab-O-Sil" is particularly preferred for the present composition. When distributed in water with the formulation disclosed herein, a transparent, clear liquid is provided, since the particles are so tiny and transparent that they are invisible or hardly visible to the naked eye in the concentrations used.

"Cab-O-Sil" is a colloidal, submicroscopic, pyrogenic silica prepared in a hot, gaseous environment by a vapor-phase, flame hydrolysis, at high temperature (around 1100° C.), of a silicon compound, such as silicon tetrachloride. It is distinct from silica gel obtained by precipitation of silicic acid from an aqueous silicate solution, and hardening of the precipitate. Silica gel, thus formed, is internally porous, whereas "Cab-O-Sil" has an enormous external surface area and no internal porosity.

"Cab-O-Sil" contains no water-soluble inorganic salts. It is of high chemical purity, low water content, and has a high degree of particle separation. The properties and composition of a grade of "Cab-O-Sil" are listed as follows:

| | |
|---|---|
| Silica content (moisture-free) _____percent__ | 99.0–99.7 |
| Free moisture (105° C.) _____do____ | 0.2–1.5 |
| Ignition loss at 1000° C. (excluding moisture) _____do____ | 0.2–1.0 |
| CaO, MgO _____do____ | 0.000 |
| $Fe_2O_3 + Al_2O_3$ _____do____ | 0.01 |
| Particle size range _____micron__ | 0.015–0.020 |
| Surface area _____sq. m./gm__ | 175–200 |
| Specific gravity _____ | 2.1 |
| Color _____ | White |
| Refractive index _____ | 1.55 |
| pH (4% aqueous dispersion) _____ | 3.5–4.2 |
| Apparent bulk density _____lbs./cu. ft.__ | 2.5–7.0 |

A finer grade of "Cab-O-Sil" has the above characteristics but a particle size range of 0.007–0.010 micron, a surface area of substantially 325 sq. m./gm., and a refractive index of 1.46.

The various grades of "Cab-O-Sil" may be used interchangeably.

It is found that, except for the minor ingredients such as dye or coloring, and the surfactant, it is best not to use the chemicals in a finely powdered form. It is advantageous and preferable to use them in granular form with particle sizes preponderantly between substantially 10 and 60 mesh and with a major proportion between 20 and 40 mesh. It is not found objectionable when minor fractions are somewhat larger than 10 mesh and as fine as 80 to 100 mesh.

The following examples designated as C and D serve to illustrate the invention as disclosed in said application Ser. No. 210,584:

(C)

The following solid ingredients are mixed together in finely divided but granular form preferably in the order listed. The preferred proportions are given in parts by weight.

| | |
|---|---|
| Sodium perborate _____ | 30 |
| Dipotassium persulphate _____ | 20 |
| Trisodium phosphate _____ | 30 |
| Sodium carbonate _____ | 20 |
| Phenolphthalein _____ | 0.01 |
| Nacconol NR (sodium dodecylbenzene sulfonate) _____ | 0.04 |
| Sodium hexametaphosphate _____ | 0.25 |
| "Cab-O-Sil" _____ | 0.5–1.0 |

(D)

The following ingredients, in parts by weight, are finely granulated and mixed together:

| | |
|---|---|
| Sodium perborate _____ | 40 |
| Dipotassium persulfate _____ | 10 |
| Trisodium phosphate _____ | 20 |
| Sodium carbonate _____ | 30 |

If desired, and for various purposes, enzymic or enzymatic agents are advantageously included in the above compositions. Catalase in the proportion of about 0.001 to 0.1 percent by weight of the composition, as well as plant-derived peroxidase serve to promote gassing. Proteolytic enzymes assist in such compositions in dissolving hardened mucin in refractory denture deposits. About 0.01 to 0.02 percent by weight of the latter enzymes is effective. Pancreatic extracts and papain perform the latter function.

A half teaspoonful of the product of Example C in an eight ounce glass of water provides a solution with a pH of about 11.6 to 12. A solution of the product of Example D, similarly prepared, has a pH of about 11.5 to 12.

It has been discovered that there are metal complexes that can serve as effective catalysts for more vigorous gassing, or increased rate of evolution of gas, for use in denture cleanser products in a manner as stated and while retaining desirable characteristics mentioned. Among the complexes there are those having the general formula $M_x[Fe(CN)_y(NO)_z]$ wherein M is H, or where H is replaced by a variety of cations; $x$ may be 2 to 4; $y$ may be 1 to 6; and $z$ may be 0 to 1. Also, Fe may be replaced by Co, Ni, Mn, Cu and other metals. Compounds, particularly desirable for use as catalysts in cleanser products in dentistry include salts of the following acids, namely, having the formulae listed below, and stable acids themselves:

$H_2[Fe(CN)_5(NO)]$
$H_3[Fe(CN)_6]$
$H_4[Fe(CN)_6]$

Compounds that are in stable, solid form are preferred for purposes of the present invention. It is considered impractical or undesirable to use, in dental cleanser products, the compounds that are not stable or not solid, or that are oxidizable or break down and give off HCN (hydrocyanic acid), or undesirable odors, or that introduce undesirable constituents that are too volatile. The acid, hydroferrocyanic acid, for instance, having the formula $H_4[Fe(CN)_6]$, is a stable, white solid that is soluble in water, ethanol, methanol, and other alcohols. It provides a clear solution while effectively increasing the rate of evolution of gas in an aqueous medium when used in association with a denture cleanser containing a peroxidized compound. Its cost, however, is an item that renders it unattractive for use in a commercial dental cleanser product.

Hydrogen in the above acids is replaceable in part or completely by sodium, potassium, calcium, barium, and other alkali and alkaline earth metals, singly, or in combinations thereof, taking their valences into account.

Any element or group of elements as a radical, that functions or can function as a cation, may replace the hydrogen in the above acid formulae. Such radicals are cited as $NH_4$, VO, $UO_2$, $MoO_2$ or $WO_2$ ions. From the standpoint of the periodic table, the H is replaceable in part or completely by a variety of cations, or metals such as those in Groups I–A, I–B, II–A, II–B, III–A, III–B, IV–A, IV–B, V–A, V–B, VI–A, VI–B, VII, and VIII.

Certain compounds mentioned for use as catalysts for purposes herein described are generally referred to as cyanoferrates, or prussiates, and include materials such as the nitro prussides, for instance, $Na_2$ and $K_2[Fe(CN)_5(NO)]$ The cyanoferrate anions have desirable properties in that they effect increased gas evolution and do not decompose in an oxygen-producing medium or in strong alkaline solutions. The water-soluble ferro and ferricyanides as well as the nitroprussides produce yellow solutions and no solid precipitates in the presence of the above-described denture cleanser compositions. Furthermore, in their use as catalysts and after an initial period of their presence for twenty-four hours in a cleansing solution, further addition of denture cleanser material to the solution produces renewed accelerated active gassing.

Several commercial brands of Prussian blue provide very good gassing with the above denture cleanser, as do Turnbull's blue freshly prepared from ferrous sulphate and potassium ferricyanide. A precipitate is formed with them and similar compounds because their cations appear in the denture cleanser solution in solid form by double decomposition with active components of the denture cleanser while the anions go into solution as soluble prussiates.

Besides the above cyano ferrates, there are mentioned other compounds which involve complex iron cyanides of aliphatic bases, of aromatic bases, of heterocyclic bases, of alkaloids, and of other basic compounds. In general, the organic ferrocyanides are also colored crystalline compounds which are usually infusible, insoluble or slightly soluble in cold water, and relatively stable at room temperature. Ferrocyanides of diamino compounds tend to be relatively unstable and more insoluble.

Among the cyanogen compounds, those with iron in the anion are to be recommended. Of the hexacyano compounds, the ferrocyanides, including ferrocyanic acid, $H_4[Fe(CN)_6]$, are preferred over the ferricyanides, including ferricyanic acid, $H_3[Fe(CN)_6]$, for use in the denture cleanser products. The ferrocyanides are more stable and cheaper. The ferricyanides are generally less stable and more expensive. Incidentally, in the case of cobalt, the reverse is true as to stability, cobalto cyano complexes being less stable than the cobalti.

The most desirable hexacyano compounds are the soluble alkali prussiates including sodium and potassium ferrocyanides. These form substantially permanent, clear solutions with a pleasing yellow color, in the presence of the required proportion of the denture cleanser material in water. Ammonium ferrocyanide is mentioned but its liberation of ammonia is not always desirable.

The prussiates vary considerably as to solubility. Both the soluble and insoluble cyano ferrates are generally equally effective catalytically. The insoluble ones chemically react with alkaline solution of a cleanser mix in such a fashion that a soluble prussiate is formed from the anionic portion of the insoluble catalyst and the alkali components of the cleanser mix, soluble ferro- or ferricyanide being formed depending on the derivation and origin of the insoluble catalyst. For instance, if a blue, solid catalyst is made from a water-soluble ferrocyanide, then a ferrocyanide is formed in the cleanser solution. If an insoluble blue is made from a soluble ferricyanide, then a water-soluble ferricyanide is formed by reaction with the cleanser solution. In either case, the polyvalent metal comprising the cation of the insoluble blue is split off in the cleanser solution for formation of the corresponding hydroxide, carbonate, phosphate, or mixture thereof, depending on what anions are represented in the denture cleanser solution.

Among the water-soluble prussiates, calcium ferrocyanide, $Ca_2[Fe(CN)_6]$, provides good gassing; barium ferrocyanide, $Ba_2[Fe(CN)_6]$, provides very excellent gassing; calcium potassium ferrocyanide, $CaK_2[Fe(CN)_6]$, provides excellent gassing, but in each case a flocculent precipitate keeps rising in the cleanser solution during gassing.

Where desired gassing and other results are obtainable, but turbidity, or cloudiness is found objectionable, as in the use of prussiates as the catalysts and in which H of the acids is partially or wholly replaced by calcium or other alkaline earth or other polyvalent metal, for example, $CaK_2[Fe(CN)_6]$ with which only slight turbidity in a cleanser solution is likely, such turbidity is lessened or prevented by appropriately changing the cleanser formulation to include a sequestering agent such as hexametaphosphate, tripolyphosphate, or pyrophosphate, or even EDTA (ethylenediamine tetraacetic acid) or related chelating agents.

It is advantageous to use catalysts, or catalyst mixtures that have the least amount of water of crystallization. This is also preferred as to other constituents of the cleanser. The reasons are mainly that caking of the cleanser product is prevented, and premature catalysis or local decomposition is substantially avoided, leading to increased shelf-life of the denture cleanser product. In general, the insoluble prussiates are advantageous in this respect because they are usually free of water of crystallization.

Solid cleanser mixes of the present invention contain solid catalysts that may be soluble or insoluble in water. When any of such solid mixes is introduced into water for cleansing a denture, the water-soluble constituents, including a peroxidized compound such as perborate or persulfate or percarbonate, proceed to go into solution, and the bubbling or gassing commences. While the catalyst continues to be in a solid state the catalytic effect is most pronounced and the evolution of gas is most vigorous for a given catalyst. Such evolution takes place most vigorously at the points of contact between the solid particles and the liquid. Around each solid particle of catalyst, the action is localized and there is a zone or layer that has the highest concentration of catalytic material in a given system, and therefore the catalytic effect is greatest in such zone or layer closest to the catalyst surfaces, thereby providing a lively local gas evolution which in general prevents caking of the soluble constituents of the cleanser in the cleansing operation. These conditions continue so long as prussiate anion or catalytic material is still contained in the solid particles of catalyst in the cleansing solution. The bubbling continues to be most vigorous in the initial stage while the catalyst is in process of dissolving. After solid particles of a catalyst are no longer present, the catalytic effect is lessened, and bubbling or gassing continues but it is less vigorous for a period and finally ceases when all the peroxidized material is exhausted. In other words, a gradual diffusion takes place, gassing is initially accelerated, and ultimately becomes more uniform and continuous.

With certain mixed catalysts, a cyano ferrate or metal cyanogen complex of low solubility may be mixed with one of higher solubility so that a more highly vigorous evolution of gas is initially obtained. This is found useful especially in tablets containing the ingredients of a denture cleanser including a peroxidized compound plus a catalyst mixture which will cause an initial gassing of sufficient vigor to disrupt or disintegrate such tablets when placed in water. In tablets, this can also be brought about by mixing with a ferrocyanide catalyst that is included in a dental cleanser solid mix, a small proportion of complexes of EDTA salts with a heavy metal (iron, manganese, copper, or cobalt), or a cobaltic nitrite, or a cobalti cyanide. The initial catalytic effect desired may be predetermined by the nature of a catalyst or by the ratio of a more active catalyst to a less active catalyst in a catalyst mixture.

A single catalyst compound may be mixed with a denture cleanser composition in the proportion by weight of substantially 0.1 to 1% (or up to 5%) of the total cleanser composition. The total proportion of the above-described catalyst mixture, and other catalysts herein described, on the other hand, may be as low as 0.01 to 0.2 percent of the total cleanser mixture by weight. The size of the soluble catalyst particles ranges preferably from 20 to 60 mesh, or even 20 to 100 mesh, while the water-insoluble catalysts, being often colloidal in nature, may comprise particle sizes as small as several microns or a fraction of a micron.

The following examples serve to illustrate catalytically affected cleansers:

EXAMPLE 1

| | Parts by weight |
|---|---|
| Sodium perborate | 30 |
| Potassium persulfate | 20 |
| Trisodium phosphate | 30 |
| Sodium carbonate | 20 |
| Phenolphthalein | 0.01 |
| Nacconol NR | 0.04 |
| Sodium hexametaphosphate | 0.25 |
| "Cab-O-Sil" | 0.5 |
| Prussian Blue | 0.1 |

When the above mixture is added to about 8 ounces of warm water in the amount of about ½ teaspoon, the water is at first colored violet, then it changes to magenta, then to pink, and finally becomes colorless. A very small amount of pale tan flocculent solid appears eventually in the solution. The gas evolution in the cleansing solution is excellent.

EXAMPLE 2

| | Parts by weight |
|---|---|
| Sodium perborate | 30 |
| Potassium persulfate | 20 |
| Trisodium phosphate | 30 |
| Sodium carbonate | 20 |
| Phenolphthalein | 0.01 |
| Nacconol NR | 0.2 |
| Sodium hexametaphosphate | 0.25 |
| "Cab-O-Sil" | 0.5 |
| Potassium ferricyanide | 0.5 |

One half teaspoon of the above mixture is added to about 8 ounces of warm water (approximately 110° F.). The water is colored a rose pink in the beginning, then the color changes to a lighter pink, and eventually the solution becomes clear and faintly yellow. The gas evolution is very excellent.

EXAMPLE 3

A formulation similar to that in Example 1 is provided except that the Prussian Blue as catalyst is replaced by 1 part by weight of sodium nitroprusside. The initial color of the solution after addition of the cleanser composition is an orange pink which gradually turns to a pinkish tan and eventually to a clear, intense yellow. The gas evolution is extremely vigorous, especially in the beginning.

EXAMPLE 4

| | Parts by weight |
|---|---|
| Sodium perborate | 30 |
| Potassium persulfate | 20 |
| Trisodium phosphate | 30 |
| Sodium carbonate | 20 |
| Phenolphthalein | 0.02 |
| Nacconol NR | 0.02 |
| Sodium hexametaphosphate | 0.45 |
| Sodium chloride | 0.8 |
| "Cab-O-Sil" | 1.0 |
| Potassium ferrocyanide | 0.2 |

The solution, after addition of ½ teaspoonful of the above mixture to about 8 ounces of warm water becomes a strong pink which eventually in time fades out to colorless. The degassing is very good in the beginning and especially when there is still solid salt in the container adjacent to the bottom.

EXAMPLE 5

| | Parts by weight |
|---|---|
| Trisodium phosphate | 20 |
| Sodium tripolyphosphate | 20 |
| Sodium perborate | 20 |
| Sodium carbonate | 20 |
| Potassium persulfate | 20 |
| Phenolphthalein | 0.02 |
| "Duponol C" | 0.5 |
| Sodium hexametaphosphate | 0.5 |
| "Cab-O-Sil" | 0.5 |
| Calcium potassium ferrocyanide $CaK_2[Fe(CN)_6]$ | 0.2 |

On addition of ½ teaspoon of the above mixture to warm water, the solution turns an intensive pink, and very excellent gas evolution starts immediately. The gas bubbles are very fine and a foam layer appears at the surface of the liquid, because of the relatively high concentration of the surfactant. Occasional stirring is helpful in breaking up the foam layer and in expediting clarification of the liquid. Within 20 minutes the pink color disappears and the solution is crystal clear.

EXAMPLE 6

| | Parts by weight |
|---|---|
| Trisodium phosphate | 20 |
| Sodium hexametaphosphate (adjusted) | 20 |
| Sodium perborate | 20 |
| Sodium carbonate | 20 |
| Potassium persulphate | 20 |
| Phenolphthalein | 0.02 |
| "Duponol C" | 0.1 |
| "Cab-O-Sil" | 0.5 |
| Calcium potassium ferrocyanide | 0.1 |

The same observations are made in this example as in Example 5, except that gas evolution is somewhat less vigorous and the foam layer is less dense and less in volume than that observed in Example 5.

It has been found that heavy metal compounds of a chelating amino polycarboxylic acid, and heavy metal compounds of a cation exchange resin can be highly effectively employed as the activating agents in the present cleanser product.

Products such as heavy metals in chelated form and thus very little ionized, as in a heavy metal salt of a non-cyclic amino polycarboxylic acid, can be obtained very readily without water of crystallization. They are much less likely to cause premature oxygen release in denture cleanser compositions and thus provide better shelf-life for solid cleansers. The heavy metals compounded with the amino polycarboxylic acids, such as ethylenediamine tetraacetic acid (known as EDTA), and sold under the name Sequestrene), nitrilotriacetic acid, diethylene-triamine pentaacetic acid, hydroxy-ethyl ethylenediamine triacetic acid, and others function as activating agents in solution and therefore as homogeneous catalysts. Compounds such as sodium-cobalt EDTA, sodium-copper EDTA, sodium-nickel EDTA, sodium-ferric EDTA, sodium-ferrous EDTA, and sodium-manganese EDTA, mono sodium ferrous hydroxyethyl ethylene diamine triacetate, and mono sodium cuprous hydroxy-ethyl ethylene diamine triacetate, when substituted for the metal complexes listed as catalysts in the above Examples 1 to 6, in the same proportions or in catalytically effective amounts up to 5%, provide varying degrees of gassing. The cobalt, copper and ferric metals so compounded give excellent gassing. The gassing with the other metals varies from fair with nickel to mostly very good with ferrous metal and manganese.

The cation exchange resin materials compounded with the above heavy metals have an excellent activating effect on the aforesaid cleansers in water, which can be adapted to the control of gassing by varying the particle size of the salts. The salts are insoluble in water and serve as heterogeneous catalysts. They are obtainable finely divided (100 to 200 mesh and to 400 to 600 mesh) or in granules (10 to 50 mesh). Various mesh ranges are usable including that of a so-called micro powder. Catalysis is less vigorous with the coarser grades. When the dry particles are difficult to wet in water, a rinse with a dilute solution of a cationic, anionic, or non-ionic surfactant, overcomes such difficulty.

There are two classes of cation exchange resins, both being suitable in preparing the activating agents as heavy metal compounds, namely, the strong acid resins and the weakly acid resins.

The strongly acidic cation exchange resins, such as the polystyrene nuclear sulfonic acid type, are mostly those in which divinyl benzene is cross-linked with polystyrene sulfonic acid. The weakly acidic cation exchange resins are those of the carboxylic acid type such as those prepared by copolymerization of methacrylic acid and divinyl-benzene. When used in a hydrogen or a sodium cycle operation, they may be compounded, in a well-known ion exchange column, or in a batch operation, with any of the aforesaid heavy metals. It is also possible to compound a heavy metal EDTA salt with an anion exchange resin (such as a basic, quaternary amine-type anion exchange resin), because in such a chelated form the metals are anionic and thus react with anion exchange resins. These various resins are produced under the name Amberlite, Dowex, and others. In numerous gassing tests in which the above agents were substituted for the activating agent in Examples 1 to 6 in substantially the same proportions, or added to compositions A, B, C or D above, the gassing was good to very excellent.

Other material having cation exchange capacity is useful for the above purpose, as for instance, various natural and synthetic zeolites.

A denture to be cleaned is introduced in a water solution serving as the cleanser and is permitted to remain therein for a relatively short time. The denture is removed and washed with fresh water and inserted in the mouth. The cleanser is distinctive in that no after-taste is noticeable on a denture so treated. The color from the indicator usually fades within twenty-four hours and this serves as a warning that the solution has been used and that it is no longer sufficiently fresh for reuse. Certain of the ingredients, such as the perborates, act as strong disinfectants, and the treatment of dentures as described tends to counteract denture breath that develops when the dentures are in use.

In the use of the above-described products in cleansing dentures, a denture to be cleansed may be left in a solution of the selected composition for as long as desired without injury to the denture. One-half hour to one hour or less is usually sufficient to obtain thorough cleansing. Brushing of a denture with the solution is not necessary and should be avoided where certain plastics used in a denture structure are likely to be injured thereby. Application of a solid cleanser or of a solution thereof and rubbing of the denture by hand are generally sufficient for softening and removing scaly debris in the most difficult instances.

What is claimed is:

1. A denture cleanser having an inorganic peroxy oxygen-liberating compound for evolving gas bubbles in an aqueous medium, and organic activating material sufficient in amount to promote increased evolution and bubbling of gas in such medium, the said activating material consisting of an ion exchange resin chemically combined with a heavy metal selected from a group consisting of manganese, iron, cobalt, nickel, and copper.

2. A denture cleanser as claimed in claim 1, in which the heavy metal is combined as a cation with a cation exchange resin.

3. A denture cleanser as claimed in claim 1, in which the heavy metal is combined as an anionic metal chelate with an anion exchange resin.

4. A denture cleanser composition consisting essentially of a mixture of sodium perborate, potassium persulfate, sodium carbonate, and trisodium phosphate, which mixture generates gas bubbles when added to water, and an activating agent distributed in said mixture in amount sufficient to promote increased evolution and bubbling of gas in water, the said activating agent consisting of an ion exchange resin chemically combined with a heavy metal selected from a group consisting of manganeses, iron, cobalt, nickel, and copper.

References Cited

UNITED STATES PATENTS

| 3,211,658 | 10/1965 | Hirtz et al. | 252—99 |
| 3,243,378 | 3/1966 | Stoltz et al. | 252—99 |
| 3,337,466 | 8/1967 | Puetzer et al. | 252—99 |

OTHER REFERENCES

"Sequestrene," Geigy Ind. Chem., 1952, pp. 36, 48–49.

MAYER WEINBLATT, Primary Examiner

U.S. Cl. X.R.

252—95, 96, 98, 186; 424—53